(12) United States Patent
Ugaji et al.

(10) Patent No.: US 9,882,251 B2
(45) Date of Patent: Jan. 30, 2018

(54) ELECTRONIC DEVICE

(75) Inventors: Masaya Ugaji, Tokushima (JP);
Masaki Deguchi, Tokushima (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 349 days.

(21) Appl. No.: 14/236,488

(22) PCT Filed: Aug. 3, 2012

(86) PCT No.: PCT/JP2012/004951
§ 371 (c)(1),
(2), (4) Date: Jan. 31, 2014

(87) PCT Pub. No.: WO2013/021604
PCT Pub. Date: Feb. 14, 2013

(65) Prior Publication Data
US 2014/0162112 A1    Jun. 12, 2014

(30) Foreign Application Priority Data

Aug. 5, 2011  (JP) .................................. 2011-171918

(51) Int. Cl.
*H01M 10/623*    (2014.01)
*H01M 4/505*    (2010.01)
(Continued)

(52) U.S. Cl.
CPC ..... *H01M 10/5008* (2013.01); *H01M 2/1022* (2013.01); *H01M 4/505* (2013.01);
(Continued)

(58) Field of Classification Search
CPC ............. H01M 10/617; H01M 10/623; H01M 10/4207; H01M 2/1022; H01M 4/505; H01M 4/525; G06F 1/635
See application file for complete search history.

(56) References Cited

U.S. PATENT DOCUMENTS 6,696,197 B2 * 2/2004 Inagaki ............... H01M 2/0212
361/679.54
6,946,216 B2 * 9/2005 Mu-Tsai ............... H01M 2/1022
429/120
(Continued)

FOREIGN PATENT DOCUMENTS

CN          102263424    * 11/2011
JP       2002-110115 A      4/2002
(Continued)

OTHER PUBLICATIONS

Periasamy, P., Kalaiselvi, N., Kim, H.S., High Voltage and High Capacity Characteristics of LiNi1/3Co1/3Mn1/3O2 Cathode for Lithium Battery Applications, Int. J. Electrochem. Sci., 2 (2007) 689-699.*

(Continued)

*Primary Examiner* — Ula C Ruddock
*Assistant Examiner* — Thomas Parsons
(74) *Attorney, Agent, or Firm* — McDermott Will & Emery LLP

(57) ABSTRACT

Disclosed is an electronic device including: a component that generates heat while operating; a first battery capable of being charged and discharged; a second battery that is capable of being charged and discharged, and has a higher heat resistance than the first battery; and a housing accommodating the component, and providing a first space for accommodating the first battery and a second space for accommodating the second battery. The first space and the second space are arranged such that the temperature of the second battery becomes higher than that of the first battery on average, while the component is operating.

16 Claims, 2 Drawing Sheets

(51) Int. Cl.
*H01M 4/525* (2010.01)
*H01M 10/617* (2014.01)
*H01M 2/10* (2006.01)
*H01M 10/42* (2006.01)

(52) U.S. Cl.
CPC ....... *H01M 4/525* (2013.01); *H01M 10/4207* (2013.01); *H01M 10/617* (2015.04); *H01M 10/623* (2015.04)

(56) References Cited

U.S. PATENT DOCUMENTS

| | | | |
|---|---|---|---|
| 2004/0091778 A1* | 5/2004 | Ozaki | H01M 4/1391 429/231.1 |
| 2011/0062378 A1* | 3/2011 | Chang | H01M 4/131 252/182.1 |

FOREIGN PATENT DOCUMENTS

| | | |
|---|---|---|
| JP | 2002-117828 A | 4/2002 |
| JP | 2004-095357 A | 3/2004 |

OTHER PUBLICATIONS

International Search Report issued in International Application No. PCT/JP2012/004951 dated Nov. 6, 2012, with English translation, 2 pgs.

* cited by examiner

ELECTRONIC DEVICE

RELATED APPLICATIONS

This application is the U.S. National Phase under 35 U.S.C. § 371 of International Application No. PCT/JP2012/004951, filed on Aug. 3, 2012, which in turn claims the benefit of Japanese Application No. 2011- 171918, filed on Aug. 5, 2011, the disclosures of which are incorporated by reference herein.

TECHNICAL FIELD

The present invention relates to electronic devices incorporating batteries. More specifically, it relates to a technique, in an electronic device in which a plurality of batteries are distributed inside the housing thereof, for reducing the difference in the long-term characteristics among those batteries as much as possible.

BACKGROUND ART

Portable electronic devices such as notebook personal computers are getting smaller in size and thickness. A reduction in size or thickness of an electronic device means a smaller internal space of the housing thereof. Therefore, it is getting difficult to concentratedly arrange a plurality of batteries used as the power source of the device, at one location inside the housing as conventionally.

In other words, it is getting necessary to arrange batteries of the same shape or different shapes in a decentralized manner inside the housing so that the spaces between various components packed inside the small housing can be effectively utilized.

Patent Literature 1 proposes placing lithium ion batteries in an unused drive bay of a portable personal computer so that the interior space of the housing can be effectively utilized.

CITATION LIST

Patent Literature

[PTL 1] Japanese Laid-Open Patent Publication No. 2004-95357

SUMMARY OF INVENTION

Technical Problem

As mentioned above, as electronic devices become smaller in size and thickness, it becomes necessary to arrange batteries of the same shape or various shapes in a decentralized manner inside the housing of the electronic devices. However, for example, a notebook personal computer includes components with comparatively high heat dissipation, such as a central processing unit (CPU), and those components are packed inside the housing. Therefore, the temperature distribution inside the housing is not uniform. This means that, for example, the batteries placed near the CPU unavoidably operate in a higher temperature environment than the other batteries. As a result, the long-term characteristics such as the capacity retention rate and the battery case bulging may become different between the batteries near the CPU and the other batteries.

The present invention intends, in an electronic device in which a plurality of batteries are distributed inside the housing thereof, to maintain the long-term characteristics uniform among the batteries as much as possible.

Solution to Problem

The present invention relates to an electronic device including:
  a component that generates heat while operating;
  a first battery capable of being charged and discharged;
  a second battery that is capable of being charged and discharged, and has a higher heat resistance than the first battery; and
  a housing accommodating the component, and providing a first space for accommodating the first battery and a second space for accommodating the second battery.

The first space and the second space are arranged such that the temperature of the second battery becomes higher than the temperature of the first battery on average, while the component is operating.

Advantageous Effects of Invention

According to the present invention, the second battery having a higher heat resistance than the first battery is placed in the second space in which the battery temperature becomes high on average inside the housing, while the first battery having a relatively low heat resistance is placed in the first space in which the battery temperature becomes low on average inside the housing. This enables the long-term characteristics among the batteries to be maintained uniform as much as possible.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
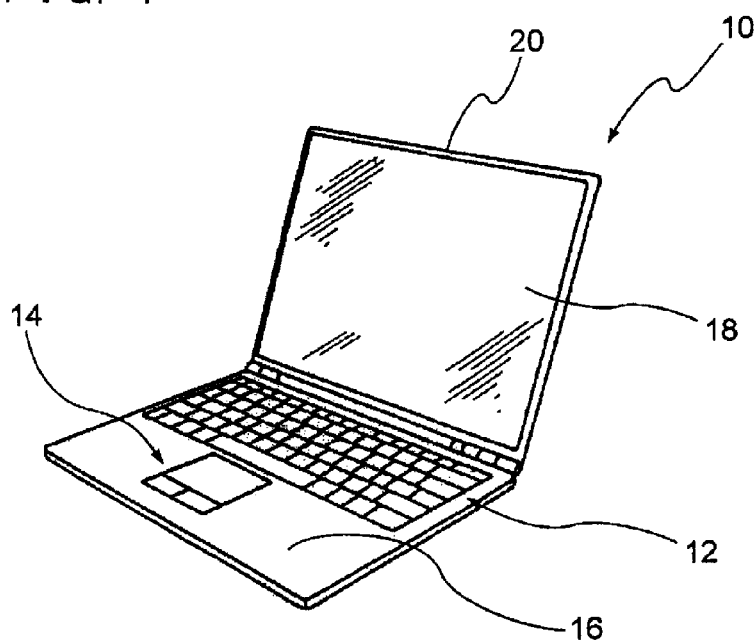
FIG. 1 An oblique view of the appearance of a notebook personal computer, which is an electronic device according to one embodiment of the present invention FIG. 2 A schematic illustration of the layout of components and batteries inside the housing of an electronic device of Embodiment 1

The present invention relates to an electronic device including: a component that generates heat while operating; a first battery capable of being charged and discharged; a second battery that is capable of being charged and discharged, and has a higher heat resistance than the first battery; and a housing. The housing accommodates the component that generates heat, and provides a first space for accommodating the first battery and a second space for accommodating the second battery. The first and second spaces are arranged such that the temperature of the second battery becomes higher than that of the first battery on average, while the component that generates heat is operating.

By arranging a plurality of batteries differing in heat resistance inside the housing of an electronic device so as to satisfy the above requirements, it is possible to avoid the batteries with low heat resistance from getting heated to a high temperature by the heat generated from the component, and thus to prevent those batteries from having extremely deteriorated long-term characteristics. It is therefore possible to prevent the long-term characteristics such as cycle life characteristics from differing significantly among the plurality of batteries. This eliminates the necessity of replacing only some of the batteries with new ones earlier than the others, and can simplify the maintenance work of the electronic device. Furthermore, in such a case where the replacement of the batteries is impossible in terms of costs, it is possible to prevent the life of the electronic device itself from being shortened.

In connection with the matter described above, the heat resistance of the battery can be defined in the relationship with the long-term characteristics of the battery. In the present invention, since what is concerned is the heat resistance of the battery in the normal use of an electronic device, the heat resistance can be defined on the basis of the criteria as below.

For example, the first battery is discharged from a fully charged state to a completely discharged state at a predetermined temperature (e.g., 44.9 to 45.1° C.), and then, charged from a completely discharged state to a fully charged state at the above predetermined temperature. The number of times of repeating the charge and discharge until the capacity of the first battery drops to 80% of the rated capacity thereof is denoted as $N1$. On the other hand, the second battery is discharged from a fully charged state to a completely discharged state at the above predetermined temperature, and then, charged from a completely discharged state to a fully charged state at the above predetermined temperature. The number of times of repeating the charge and discharge until the capacity of the second battery drops to 80% of the rated capacity thereof is denoted as $N2$. If $N1<N2$, the second battery can be regarded as having a higher heat resistance than the first battery. In the present invention, the larger the difference between $N1$ and $N2$ is, the more evident the effect of maintaining uniform the long-term characteristics of the batteries is. For example, when $N2/N1$ is 1.5 or more, the above effect is sufficiently evident. More preferably, $N2/N1$ is 2 or more.

The predetermined temperature is not necessarily set at approximately 45° C., and the repetition of charge and discharge is not necessarily done between a fully charge state and a completely discharged state. The predetermined temperature can be set, for example, according to the temperature of the environment in which the second battery is used in actual electronic devices. The range of the voltage (or the state of charge (SOC)) within which charge and discharge are repeated can also be set, for example, according to the typical voltage range of charge and discharge in actual electronic devices.

Furthermore, whether the heat resistance of one battery is higher than another battery can be evaluated by comparing the quantities of electricity remaining in the batteries, after the batteries in a fully charged state have been left to stand for a predetermined time period in the environment of the above predetermined temperature. The battery in which the percentage of the remaining quantity of electricity is high can be regarded as having a higher heat resistance than the battery in which the percentage is low. The above predetermined time period can be set, for example, for 10 to 60 days in a 45° C. environment. In a 60° C. environment, it can be set for 1 to 30 days. In an 80° C. environment, it can be set for several hours to 3 days.

As mentioned above, it is preferable to define the level of the heat resistance of the battery as high or low, under the conditions close to the conditions of normal use of an electronic device. Thus, the batteries can be effectively arranged in the interior of the housing of the electronic device such that the long-term characteristics of the batteries are improved as a whole.

In the present invention, as described above, the second battery with relatively high heat resistance and the first battery with relatively low heat resistance are arranged inside the housing in such a layout that the temperature of the second battery becomes higher on average than that of the first battery. Such a layout can be typically realized by arranging the component such that the distance from the second battery is shorter than that from the first battery in the housing. However, this is not a limitation, and the distances between the batteries and the component may be the same. In the latter case, for example, by differing the areas of the portions of the batteries facing the component between the batteries, the amount of heat that the battery receives from the component will be different between the batteries, and thus, a difference can be provided between the temperatures of the batteries on average.

Figure 3:
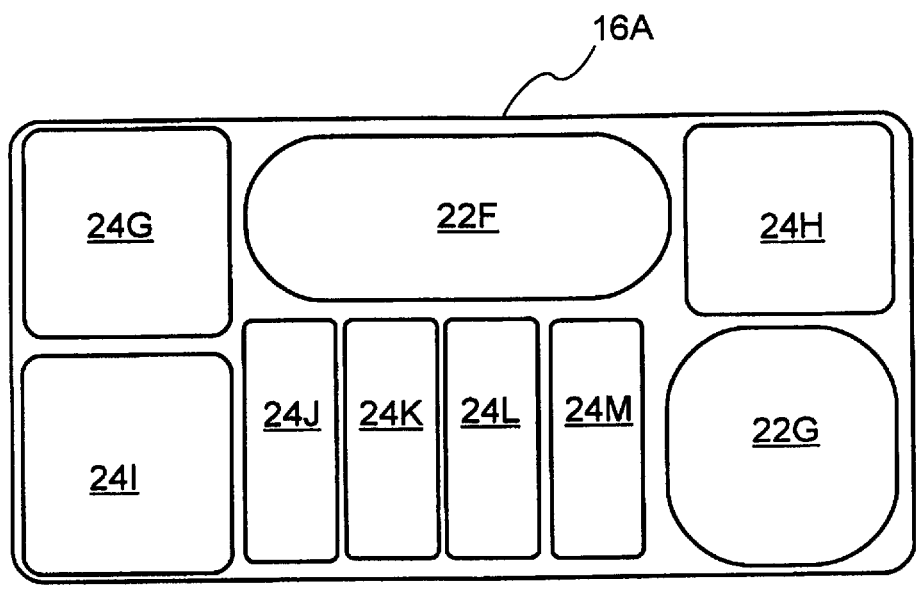
FIG. 3 A schematic illustration of the layout of components and batteries inside the housing of an electronic device of Embodiment 2

In the example of FIG. 3, batteries 24G and 24H correspond to the second battery, and these batteries are arranged such that the portion facing a component 22F that generates heat while operating has a large area. On the other hand, batteries 24J to 24M, which correspond to the first battery, are arranged such that the portion facing the above component has a small area. When the component, the first battery, and the second battery are arranged in such a manner, the temperature of the second battery on average can become higher than that of the first battery. Therefore, even in the case where the distance between the first battery and the component that generates heat while operating cannot be increased, by adjusting the orientation of the first battery with respect to the component such that the first battery receives less heat from the component, the long-term characteristics among the batteries can be maintained uniform as much as possible.

Another reason for causing a difference in the heat resistance of the battery lies in the difference in the case of battery. For example, a battery known as a laminated battery includes a pouch-shaped case made of a laminated film of a metal foil and a polymer film. Because of the flexibility of the case, the case of the laminated battery will bulge due to increased internal pressure, to a greater extent than that in a battery including a hard case made of metal. Examples of the hard case made of metal are those made of iron, an iron alloy, aluminum, and an aluminum alloy. Therefore, in the sense explained above, laminated batteries have lower heat resistance than batteries including a hard case. Conversely, batteries including a hard case have higher heat resistance than laminated batteries. In other words, the present invention encompasses an embodiment in which the second battery includes a case of a metal can, and the first battery includes a pouch-shaped case made of a laminated film of a metal foil and a polymer film.

Even though the batteries are the same in their cases and shapes, if the power generation elements housed in the cases are different, the heat resistance of the battery is different. Specifically, for example, lithium ion secondary batteries generally include a negative electrode, a positive electrode, a separator interposed between the negative electrode and the positive electrode, and a non-aqueous electrolyte. The long-term heat resistance of lithium ion secondary batteries tends to be influenced by the positive electrode material. The influence due to the difference in the positive electrode material is evident particularly between batteries including a carbon material such as graphite as the negative electrode material.

The positive electrode of lithium ion secondary batteries typically includes a positive electrode core material, and a positive electrode material mixture layer adhering to a surface thereof. The positive electrode material mixture layer includes as an essential component, a positive electrode active material such as a lithium transition metal composite oxide, and as optional components, an electrically conductive agent such as carbon black, and a binder such as polyvinylidene fluoride. No particular limitation is imposed on the conductive agent and the binder. The positive electrode core material is, for example, a sheet of stainless steel, aluminum, or titanium.

The positive electrode active material is not particularly limited, but typically is a composite oxide containing lithium and a metal element other than lithium. The metal element other than lithium preferably includes Ni, Mn or Co, as an essential element. Examples of the positive electrode active material include lithium nickel oxide ($LiNiO_2$), modified products of lithium nickel oxide, lithium cobalt oxide ($LiCoO_2$), modified products of lithium cobalt oxide, lithium manganese oxide ($LiMn_2O_4$), modified products of lithium manganese oxide, and materials obtained by partially substituting Co, Ni or Mn in these oxides by another transition metal element, a typical metal element such as aluminum, or an alkaline-earth metal element such as magnesium.

Here, when the positive electrode active material is a composite oxide containing lithium and a metal element other than lithium, the heat resistance of the battery differs depending on the kind of the metal element other than lithium. For example, a battery including a lithium transition metal oxide X in which the metal element other than lithium includes 50 mol % or more of nickel, relative to lithium, and which has a layered rock-salt structure (hereinafter, "nickel type lithium battery") is excellent in long-term heat resistance. The lithium transition metal oxide X contains preferably 70 mol % or more, and more preferably 80 mol % or more of nickel, relative to lithium.

The lithium transition metal oxide X can be represented by, for example, the general formula: $LiNi_{1-y}M_yO_2$, where M is at least one selected from the group consisting of Co, Al, Mn, Mg, Fe, Ca, Ti, Zr, and P, and $0 \leq y \leq 0.4$. Here, M preferably at least includes Al and Co. Such a lithium transition metal oxide X can be represented by the general formula: $LiNi_{1-z-w}Co_zAl_wO_2$, where $0.1 \leq z \leq 0.3$ and $0.03 \leq w \leq 0.1$, or the general formula: $LiNi_{1-t-u}Mn_tCo_uO_2$, where $0.15 \leq t \leq 0.4$, $0.05 \leq u \leq 0.3$, and $0.2 \leq t+u \leq 0.5$.

The recent study conducted by the present inventors has revealed that the heat resistance of nickel type lithium batteries is higher than those of lithium ion secondary batteries including a cobalt-based positive electrode material (hereinafter, "cobalt type lithium batteries"), lithium ion secondary batteries including a positive electrode material containing nickel, cobalt and manganese (hereinafter, "nickel-cobalt-manganese type lithium batteries"), and lithium ion secondary batteries including a positive electrode material containing manganese and/or titanium (hereinafter, "manganese-titanium type lithium batteries"). Therefore, when the first battery is a cobalt type lithium battery, a nickel-cobalt-manganese type lithium battery, or a manganese-titanium type lithium battery, the second battery may be a nickel type lithium battery.

Cobalt type lithium batteries include, as a positive electrode active material, a lithium transition metal oxide A containing 50 mol % or more, and preferably 80 mol % or more of cobalt, relative to lithium. The lithium transition metal oxide A has a layered rock-salt structure. Examples of the lithium transition metal oxide A include lithium cobalt oxide ($LiCoO_2$), and modified products of lithium cobalt oxide.

Nickel-cobalt-manganese type lithium batteries include, as a positive electrode active material, a lithium transition metal oxide B containing 20 to 40 mol % of nickel, 20 to 40 mol % of manganese, and 20 to 40% of cobalt, relative to lithium. The lithium transition metal oxide B has a layered rock-salt structure. Examples of the lithium transition metal oxide B include $LiNi_{1/3}Mn_{1/3}Co_{1/3}O_2$.

Manganese-titanium type lithium batteries include, as a positive electrode active material, a lithium transition metal oxide C containing at least one selected from manganese and titanium, and having a spinel structure. Such a lithium transition metal oxide C can be represented by the general formula: $Li_{1+x}M^1{}_yM^2{}_{2-x-y}O_{4-z}$, where $M^1$ is at least one selected from the group consisting of V, Cr, Fe, Co, Ni, Zn, Cu, W, Mg, and Al, $M^2$ is at least one selected from the group consisting of Mn and Ti, $0 \leq x \leq 0.2$, $0 \leq y < 0.5$, and $0 \leq z < 0.2$. Examples thereof include $LiMn_2O_4$.

Typical examples of the electronic device to which the present invention is applicable are mobile computers such as notebook personal computers, personal digital assistants or assistance (PDAs), and smart phones. The present invention is also applicable to stationary electronic devices. When applied to a mobile computer, typical examples of the component that generates heat while operating are a central processing unit (CPU) and a memory. A memory is a component that exchanges information with the CPU, and temporarily or semi-permanently stores the data to be computed by the CPU or the resultant data computed by the CPU.

As for the layout of the component that generates heat while operating, the first battery, and the second battery, more specifically, they may be arranged such that the component and the first and second batteries are within a rectangular planar region, the component is placed near one side of the planar region, and the first battery is placed near the side opposite to the one side. In such a layout, the second battery is preferably placed between the component and the first battery. By arranging as above, the heat radiation from the component toward the first battery can be blocked by the second battery.

Furthermore, in the present invention, the first and second batteries are not limited to one each. The present invention is applicable when using a plurality of the first batteries connected to each other. Likewise, the present invention is applicable when using a plurality of the second batteries connected to each other.

The first and second batteries are not limited to lithium ion secondary batteries, and may be various non-aqueous electrolyte secondary batteries. They may be aqueous batteries such as nickel-metal hydride storage batteries and nickel-cadmium storage batteries.

In the following, Embodiments of the present invention are described with reference to drawings.

(Embodiment 1)

FIG. 1 is an oblique view of the appearance of a notebook personal computer, which is an electronic device according to Embodiment 1 of the present invention.

A personal computer 10 as illustrated includes a main body-side housing 16 provided with a keyboard 12 and a pointing device 14 on the top, and a lid-side housing 20 provided with a liquid-crystal display 18.

Figure 2:
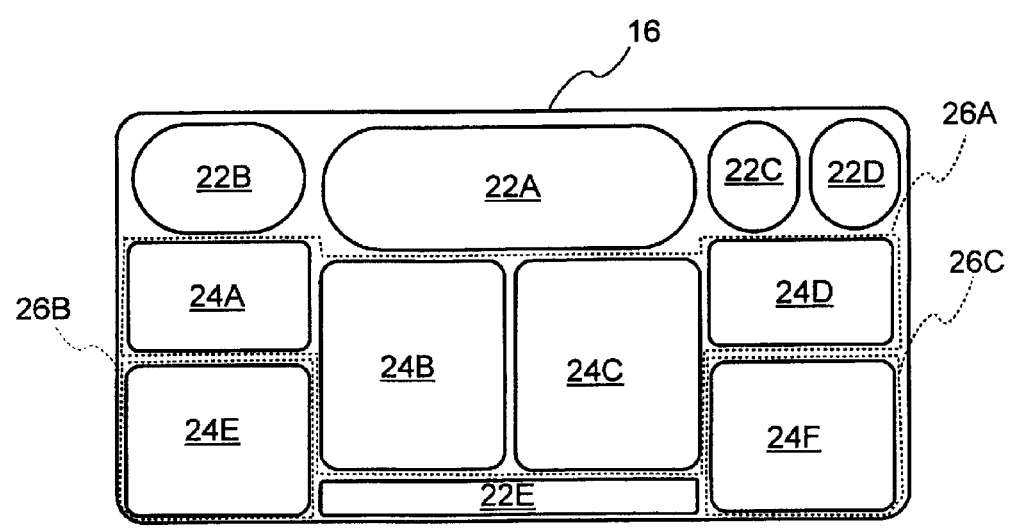

The internal structure of the main body-side housing 16 is illustrated in FIG. 2. FIG. 2 is a bottom view of the main body-side housing 16 with the bottom plate thereof removed, and schematically illustrates the interior of the main body-side housing 16 seen from below. As illustrated in the figure, the main body-side housing 16 accommodates in its interior, various components 22A, 22B, 22C, 22D, and 22E, and batteries of various shapes 24A, 24B, 24C, 24D, 24E, and 24F, arranged in a predetermined layout.

Components 22A to 22D are ones that generate heat while operating (e.g., CPU, memory, and condenser). The component 22E is one that generates little heat. Batteries of various sizes are used in combination as the batteries 24A to 24F so as to maximize the total capacity of the batteries included in the interior of the main body-side housing 16.

At the positions adjacent to the components 22A to 22D that generate heat while operating, the batteries 24A to 24D are placed which are lithium ion secondary batteries with comparatively high heat resistance. In short, the batteries 24A to 24D correspond to the second battery, and a space 26A accommodating the batteries 24A to 24D corresponds to the second space.

The batteries 24A to 24D with comparatively high heat resistance are, for example, nickel type lithium batteries. The long-term heat resistance of the batteries can be easily improved when the lithium transition metal oxide X used as the positive electrode active material of the nickel type lithium batteries contains 50 mol % or more, or 70 mol % or more, or 80 mol % or more of Ni, relative to lithium (e.g., by using a composite oxide represented by the general formula: $LiNi_{1-z-w}Co_zAl_wO_2$, where $0.1 \leq z \leq 0.3$ and $0.03 \leq w \leq 0.1$, or the general formula: $LiNi_{1-t-u}Mn_tCo_uO_2$, where $0.15 \leq t \leq 0.4$, $0.05 \leq u \leq 0.3$, and $0.2 \leq t+u \leq 0.5$).

On the other hand, at the positions not adjacent to the components 22A to 22D that generate heat while operating, the batteries 24E and 24F are placed which are lithium ion secondary batteries with comparatively low heat resistance. In short, the batteries 24E and 24F correspond to the first battery, and spaces 26B and 26C accommodating the batteries 24E and 24F, respectively, correspond to the first space.

In that way, in the personal computer 10 as illustrated, the components 22A to 22E, the first batteries, and the second batteries are arranged so as to be within a rectangular planar region inside the main body-side housing 16. The components 22A to 22D, i.e., the components that generate heat while operating, are placed near one side of the planar region (the upper side of FIG. 2). The batteries 24E and 24F, i.e., the first batteries, are placed near the side opposite to the one side, and the batteries 24A to 24D, i.e., the second batteries, are placed between the components 22A to 22D and the batteries 24E and 24F. Therefore, the heat radiation from the components 22A to 22D toward the batteries 24E and 24F can be effectively blocked by the batteries 24A to 24D.

Since the components 22A to 22D that generate heat while operating are concentrated near one side of the planar region as described above, a space where the temperature is comparatively low can be created inside the housing. Therefore, by selecting batteries with high performance (e.g., volumetric capacity density) or high cost performance, which may be not so good in heat resistance, and placing those batteries in the space where the temperature is comparatively low, it is possible to improve not only the long-term characteristics of the batteries as a whole, but also the capacity and the cost performance.

The batteries 24E and 24F corresponding to the first battery are, for example, cobalt type lithium batteries. The cobalt type lithium batteries used as the batteries 24E and 24F preferably include a positive electrode active material containing 80 mol % or more of cobalt, relative to lithium. Other examples of the batteries 24E and 24F are batteries including the transition metal oxide B or C, such as nickel-cobalt-manganese type lithium batteries and manganese-titanium type lithium batteries.

Next, description is given of the heat resistance of the battery. The heat resistance of the battery in the present invention is defined in view of maintaining uniform the long-term characteristics of the batteries in the normal use of an electronic device. For example, the temperature around the CPU of a notebook personal computer becomes usually 10 to 20° C. higher than atmospheric temperature. With this taken into account, for example, in a 45° C. environment, the battery is repetitively charged and discharged. Typically, the battery is discharged from a fully charged state to a completely discharged state, and then charged from a completely discharged state to a fully charged state, and the charge and discharge are repeated. The range of the charge and discharge is not limited to the above, and can be determined according to the actual range of the charge and discharge in the electronic device.

Here, when the number of times of repeating the charge and discharge until the capacity of the first battery drops to 80% of the rated capacity thereof is denoted by N1, and the number of times of repeating the charge and discharge until the capacity of the second battery drops to 80% of the rated capacity thereof is denoted by N2, N1 and N2 satisfy N1<N2. In other words, two kinds of batteries that satisfy such relationship can be used as the first and second batteries of the present invention.

As described above, by placing the batteries 24A to 24D which are lithium ion secondary batteries having high heat resistance as a whole, at the positions adjacent to the components 22A to 22D that generate heat while operating, it is possible to prevent the long-term characteristics of the batteries placed at such positions from being worsened to a large extent. On the other hand, batteries to be placed at the positions not adjacent to the components 22A to 22D that generate heat while operating can be selected, mainly in view of the performance and cost performance, regardless of whether the heat resistance thereof is high or low. This can improve the performance of the batteries incorporated in the electronic device as a whole.

Next, Embodiment 2 of the present invention is described.

(Embodiment 2)

FIG. 3 illustrates the internal structure of a notebook personal computer, which is an electronic device according to Embodiment 2 of the present invention. This figure also schematically illustrates, as the internal structure of the notebook personal computer, the interior of a main body-side housing 16A seen from below, with the bottom plate thereof removed.

In the illustrated example, a component 22F that generates heat while operating is placed around the center and near one side (the upper side in the figure) of a rectangular planar region in the main body-side housing 16A. A component 22G that generates little heat is placed at lower right in the planar region.

Long and narrow batteries 24J, 24K, 24L, and 24M each corresponding to the first battery are arranged such that one of a pair of short sides of each battery faces the component 22F that generates heat while operating. Therefore, in the batteries 24J to 24M, the area per battery of the portion facing the component 22F is comparatively small. As a result, the amount of heat exchanged per battery between the component 22F and the batteries 24J to 24M is comparatively small. This can prevent the temperatures of the batteries 24J to 24M from increasing on average.

On the other hand, batteries 24G and 24H each corresponding to the second battery are arranged such that almost the entire surface on one side of each battery faces the component 22F. Therefore, in the batteries 24G and 24H, the area per battery of the portion facing the component 22F is comparatively large. As a result, the amount of heat per battery exchanged between the component 22F and the batteries 24G and 24H becomes comparatively large.

A battery 24I corresponding to the first battery is placed at lower left in the planar region, so as not to directly face the component 22F that generates heat while operating. As a result, the amount of heat exchanged between the component 22F and the battery 24I becomes comparatively small.

As described above, even among the batteries 24G, 24H, and 24J to 24M, the distances of which from the component that generates heat while operating are almost the same, the increase in the temperatures, on average, of the batteries with relatively low heat resistance can be suppressed, by adjusting their shape and orientation with respect to the component. This enables the achievement of an effect similar to that of Embodiment 1.

Note that although the present invention employs the concept of the first and second batteries, this does not mean that the heat resistance is limited to of two different levels. For example, in the case of using three of more kinds of batteries, given that the heat resistance is different among the batteries, the second battery can be a group of two or more kinds of batteries with relatively high heat resistance, and the first battery can be a group of two or more kinds of batteries with relatively low heat resistance.

Furthermore, the battery to be used in the present invention is not limited to a lithium ion secondary battery. Any battery that can be incorporated in an electronic device can be used, and the present invention is applicable to any electronic device incorporating batteries.

INDUSTRIAL APPLICABILITY

In the electronic device of the present invention, batteries differing in heat resistance are arranged in an optimum layout inside the housing thereof, in view of the temperature distribution. This makes it possible to arrange the batteries so as to utilize the internal space of the housing to the maximum, without particularly worsening the long-term characteristics of some of the batteries. Therefore, the present invention is most suitably applicable to portable electronic devices for which further miniaturization and thinning are expected.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10 Personal computer
16 Main body-side housing
22A to 22G Component
24A to 24M Battery

The invention claimed is:

1. An electronic device comprising:
    a component that generates heat while operating;
    a first battery capable of being charged and discharged;
    a second battery capable of being charged and discharged, the second battery having a higher heat resistance than the first battery; and
    a housing accommodating the component, and providing a first space for accommodating the first battery and a second space for accommodating the second battery,
    the first space and the second space being arranged at positions adjacent to the component, and arranged such that a temperature of the second battery becomes higher than a temperature of the first battery on average, while the component is operating.

2. The electronic device according to claim 1, wherein N1<N2, where N1 is a number of times of repeating charge and discharge at a predetermined temperature until a capacity of the first battery drops to 80% of a rated capacity of the first battery, and N2 is a number of times of repeating charge and discharge under the same conditions as the first battery until a capacity of the second battery drops to 80% of a rated capacity of the second battery.

3. The electronic device according to claim 1, wherein the component is placed in the housing such that an amount of heat exchanged with the second battery is larger than an amount of heat exchanged with the first battery.

4. The electronic device according to claim 1, wherein the first battery includes, as a positive electrode active material, a lithium transition metal oxide A capable of absorbing and releasing lithium, the lithium transition metal oxide A containing 50 mol % or more of cobalt, relative to lithium, and having a layered rock-salt structure, and
    the second battery includes, as a positive electrode active material, a lithium transition metal oxide X capable of absorbing and releasing lithium, the lithium transition metal oxide X containing 50 mol % or more of nickel, relative to lithium, and having a layered rock-salt structure.

5. The electronic device according to claim 4, wherein the lithium transition metal oxide X is represented by the general formula: $LiNi_{1-z-w}Co_zAl_wO_2$, where $0.1 \leq z \leq 0.3$ and $0.03 \leq w \leq 0.1$.

6. The electronic device according to claim 4, wherein the lithium transition metal oxide X is represented by the general formula: $LiNi_{1-t-u}Mn_tCo_uO_2$, where $0.15 \leq t \leq 0.4$, $0.05 \leq u \leq 0.3$, and $0.2 \leq t+u \leq 0.5$.

7. The electronic device according to claim 1, wherein the first battery includes, as a positive electrode active material, a lithium transition metal oxide B capable of absorbing and releasing lithium, the lithium transition metal oxide B containing 20 to 40 mol % of nickel, 20 to 40 mol % of manganese, and 20 to 40% of cobalt, relative to lithium, and having a layered rock-salt structure, and
    the second battery includes, as a positive electrode active material, a lithium transition metal oxide X capable of absorbing and releasing lithium, the lithium transition metal oxide X containing 50 mol % or more of nickel, relative to lithium, and having a layered rock-salt structure.

8. The electronic device according to claim 7, wherein the lithium transition metal oxide X is represented by the general formula: $LiNi_{1-z-w}Co_zAl_wO_2$, where $0.1 \leq z \leq 0.3$ and $0.03 \leq w \leq 0.1$.

9. The electronic device according to claim 7, wherein the lithium transition metal oxide X is represented by the general formula: $LiNi_{1-t-u}Mn_tCo_uO_2$, where $0.15 \leq t \leq 0.4$, $0.05 \leq u \leq 0.3$, and $0.2 \leq t+u \leq 0.5$.

10. The electronic device according to claim 1, wherein the first battery includes, as a positive electrode active material, a lithium transition metal oxide C capable of absorbing and releasing lithium, the lithium transition metal oxide C containing at least one selected from manganese and titanium, and having a spinel structure, and
    the second battery includes, as a positive electrode active material, a lithium transition metal oxide X capable of absorbing and releasing lithium, the lithium transition metal oxide X containing 50 mol % or more of nickel, relative to lithium, and having a layered rock-salt structure.

11. The electronic device according to claim 10, wherein the lithium transition metal oxide X is represented by the general formula: $LiNi_{1-z-w}Co_zAl_wO_2$, where $0.1 \leq z \leq 0.3$ and $0.03 \leq w \leq 0.1$.

12. The electronic device according to claim 10, wherein the lithium transition metal oxide X is represented by the general formula: $LiNi_{1-t-u}Mn_tCo_uO_2$, where $0.15 \leq t \leq 0.4$, $0.05 \leq u \leq 0.3$, and $0.2 \leq t+u \leq 0.5$.

13. The electronic device according to claim 1, wherein the component includes a central processing unit, and a memory capable of exchanging information with the central processing unit.

14. The electronic device according to claim 1, wherein the component, the first battery, and the second battery are arranged so as to be within a planar region having a rectangular shape, the component is placed near one side of the planar region, and the first battery is placed near a side opposite to the one side, than the second battery.

15. The electronic device according to claim 1, comprising a plurality of the first batteries connected to each other, and a plurality of the second batteries connected to each other.

16. The electronic device according to claim 1, wherein the first battery having a lower heat resistance than the second battery is placed a further distance away from the component than the second battery.

* * * * *